May 31, 1966 W. F. HUCK ETAL 3,253,384

ENVELOPE FILLING APPARATUS

Filed Aug. 24, 1962 8 Sheets-Sheet 1

INVENTORS
WILLIAM F. HUCK
ZYGMUNT V. KSIEZOPOLSKI
BY Albert Z. Johnston
ATTORNEY INVENTORS
WILLIAM F. HUCK
ZYGMUNT V. KSIEZOPOLSKI
BY
Albert R. Johnston
ATTORNEY INVENTORS
WILLIAM F. HUCK
ZYGMUNT V. KSIEZOPOLSKI
BY
Albert C. Johnston
ATTORNEY May 31, 1966 W. F. HUCK ETAL 3,253,384

ENVELOPE FILLING APPARATUS

Filed Aug. 24, 1962 8 Sheets-Sheet 4

INVENTORS
WILLIAM F. HUCK
ZYGMUNT V. KSIEZOPOLSKI
BY
[signature]
ATTORNEY

INVENTORS
WILLIAM F. HUCK
ZYGMUNT V. KSIEZOPOLSKI
BY
Albert C. Johnston
ATTORNEY May 31, 1966 W. F. HUCK ETAL 3,253,384

ENVELOPE FILLING APPARATUS

Filed Aug. 24, 1962 8 Sheets-Sheet 6

INVENTORS
WILLIAM F. HUCK
ZYGMUNT V. KSIEZOPOLSKI
BY
Albert R. Johnston
ATTORNEY

ENVELOPE FILLING APPARATUS

INVENTORS
WILLIAM F. HUCK
ZYGMUNT V. KSIEZOPOLSK
BY
Albert C. Johnston
ATTORNEY

INVENTORS
WILLIAM F. HUCK
ZYGMUNT V. KSIEZOPOLSKI
BY
Albert C. Johnston
ATTORNEY United States Patent Office 3,253,384

Patented May 31, 1966

3,253,384
ENVELOPE FILLING APPARATUS

William F. Huck, Forest Hills, and Zygmunt V. Ksiezopolski, Pelham Manor, N.Y., assignors to Cambridge Machine Corporation, a corporation of New York Filed Aug. 24, 1962, Ser. No. 219,152
26 Claims. (Cl. 53—53)

This invention relates to envelope filling apparatus of the type employed, for example, for inserting letters, circulars, documents, or other mail matter into envelopes.

It is an object of the present invention to provide an envelope filling apparatus which is capable of operating at higher speeds and with greater reliability than known apparatus of this type.

It is a further object to provide an envelope filling apparatus which will fold letter-sheets, circulars, documents and the like to envelope size and insert the same into envelopes, all at a speed in excess of that possible with known apparatus of this type.

It is a further object to provide such a high speed envelope filling apparatus which is small in size and light in weight and which, as a result, may be readily transported between desired work sites.

The apparatus of the invention according to one feature thereof comprises means, such as a first continuously rotating rotor, for gripping an envelope at a supply station of the apparatus and moving it edgewise along a path such as that defined by a portion of the orbit of the first rotor to a position at a stationary filling member where it receives insert material delivered to the filling member, together with means, such as a second continuously rotating rotor describing an orbit contiguous to that of the first rotor at a zone adjacent the filling member, for gripping the envelope with insert material therein at the filling member and moving the same edgewise away from the filling member to a delivery station of the apparatus along another path such as that defined by a portion of the orbit of the second rotor.

According to another feature of the invention, the envelope is fed top first over the filling member to embrace the insert material received by the filling member and is buckled prior to its being fed over the filling member to produce a separation at the top of the envelope between the upper and lower layers thereof and thereby facilitate movement of the envelope over the filling member.

According to another feature of the invention, delivery means are provided at the delivery station of the apparatus which are operative to move the filled envelopes to a sealing station of the apparatus, and means are provided between the filling member and the delivery station which detect the thickness of each filled envelope and are operative upon the detection of a thickness varying from a desired thickness to render the delivery means inoperative so that only filled envelopes having the desired thickness are delivered to the sealing station.

According to still another feature of the invention, the envelopes to be filled are stacked one above another in a magazine with their flaps facing downwardly and folded against the envelope bodies and the envelopes are opened prior to being gripped for their edgewise movement to the filling member by a sucker head which is pivotally mounted on a horizontal axis adjacent to the magazine and is moved in one direction about its axis to a position immediately underlying the flap on the bottommost envelope in the magazine, whereby to grip that flap, and thereafter moved in the other direction about its axis to pivot the flap about the flap fold line to a position leading the body of the envelope.

These and other objects, features and advantages of the invention will be apparent from the following detailed description of an illustrative embodiment of the invention and from the accompanying drawings in which.

FIGS. 6–10 are fragmentary sectional views of the mechanism for gripping an envelope at the envelope magazine, the successive figures representing successive positions assumed by the envelope and by the gripping elements during the gripping operation; and FIGS. 11–16 are fragmentary sectional views of the mechanism for buckling an envelope prior to its insertion over the filling member, the successive figures representing successive positions assumed by the envelope by the buckling elements during the buckling operation.

Figure 1:
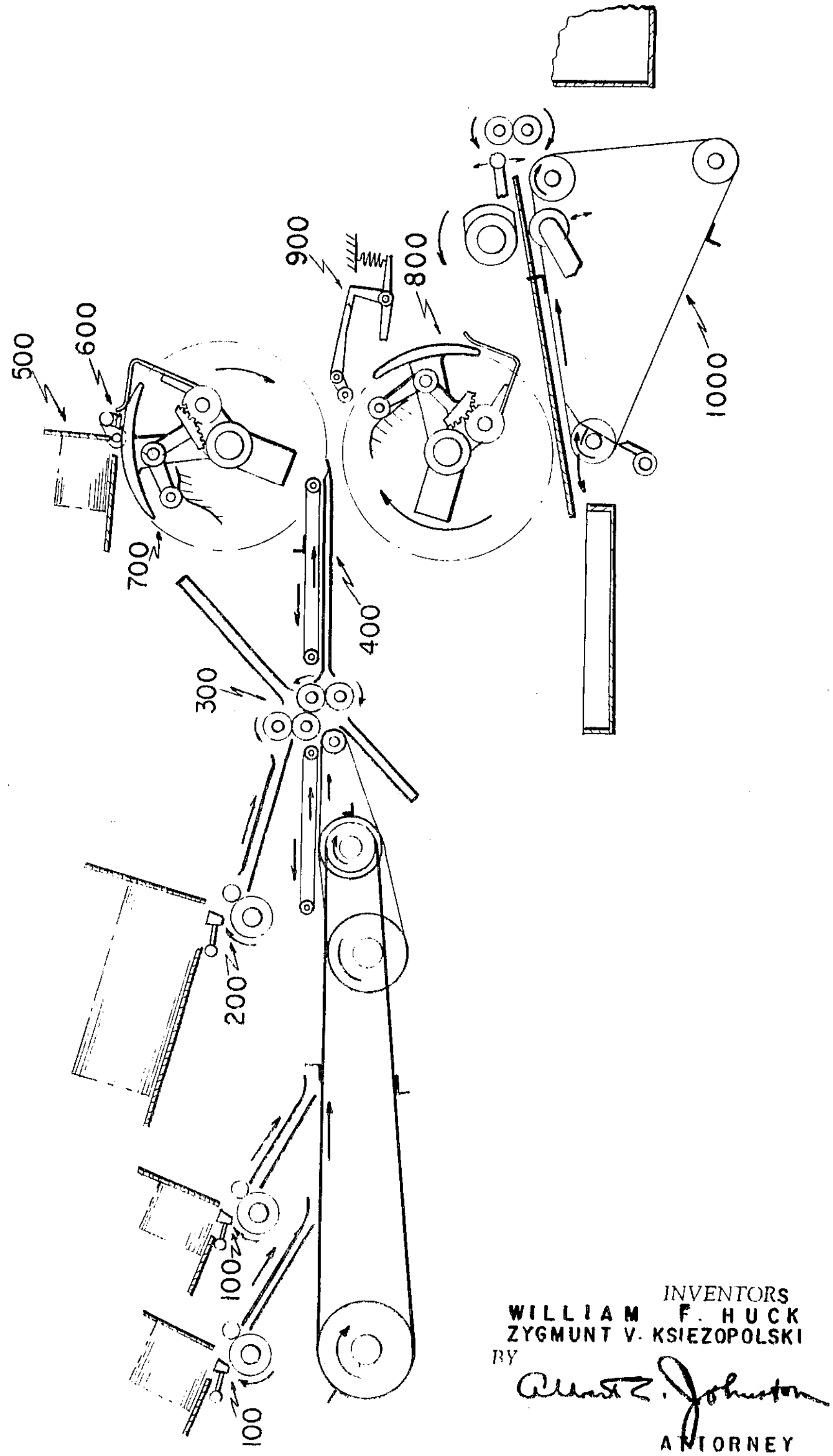
FIG. 1 is a schematic view of a filling apparatus embodying features of the present invention.

A form of apparatus embodying features of the present invention, as shown schematically in FIG. 1, includes a sheet feeder mechanism 200 which is operative to feed individual sheets to a folding mechanism 300 where the sheets are individually folded to a size suited for the envelopes to be filled; one or more insert feeder mechanisms 100 which are operative to feed individual inserts to the folding mechanism where they are inserted between the folds of a sheet, a chute assembly or horn 400 into which sets of the insert materials are fed successively upon leaving the folding mechanism; an envelope feeder magazine 500 in which the envelopes to be filled are stacked; a flap opening assembly 600 which is operative to unfold the flap of the lowermost envelope in the stack; an upper transfer cylinder assembly or rotor 700 which is operative to grip the opened flap and move the envelope to a position over the chute assembly 400 where it receives a package or set of the insert materials being fed through the chute assembly; and a lower transfer cylinder assembly or rotor 800 which is operative to grip a filled envelope and move it from the chute assembly or horn to a delivery and sealing mechanism 1000 where the filled envelope, if previously by an envelope detecting mechanism 900 to be of a desired thickness, is sealed and discharged from the apparatus.

Figure 2:
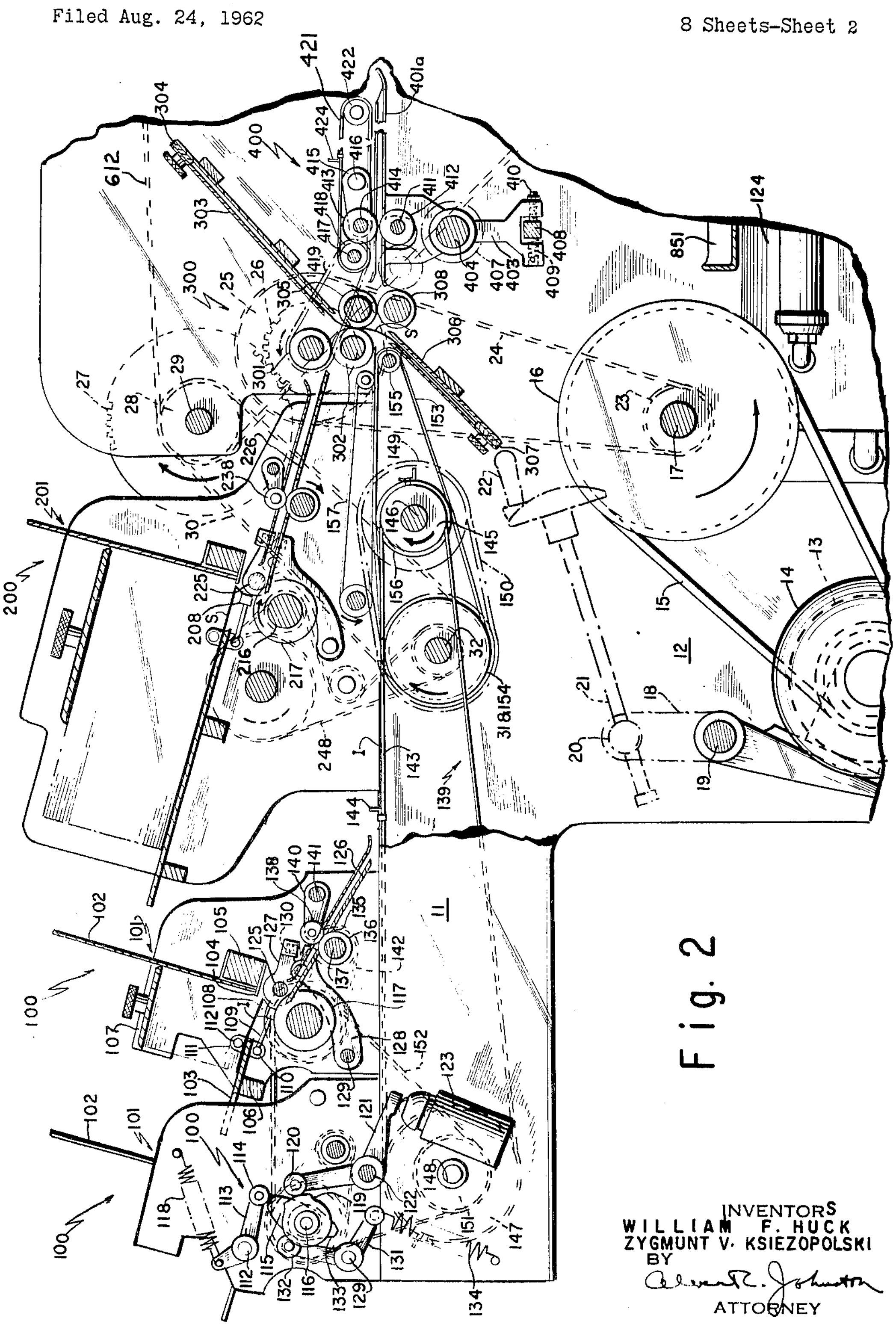
FIG. 2 is a side elevational view, partly in section, showing details of the insert feeding, sheet feeding, and folding mechanisms of the filling apparatus shown schematically in FIG. 1.
Figure 3:
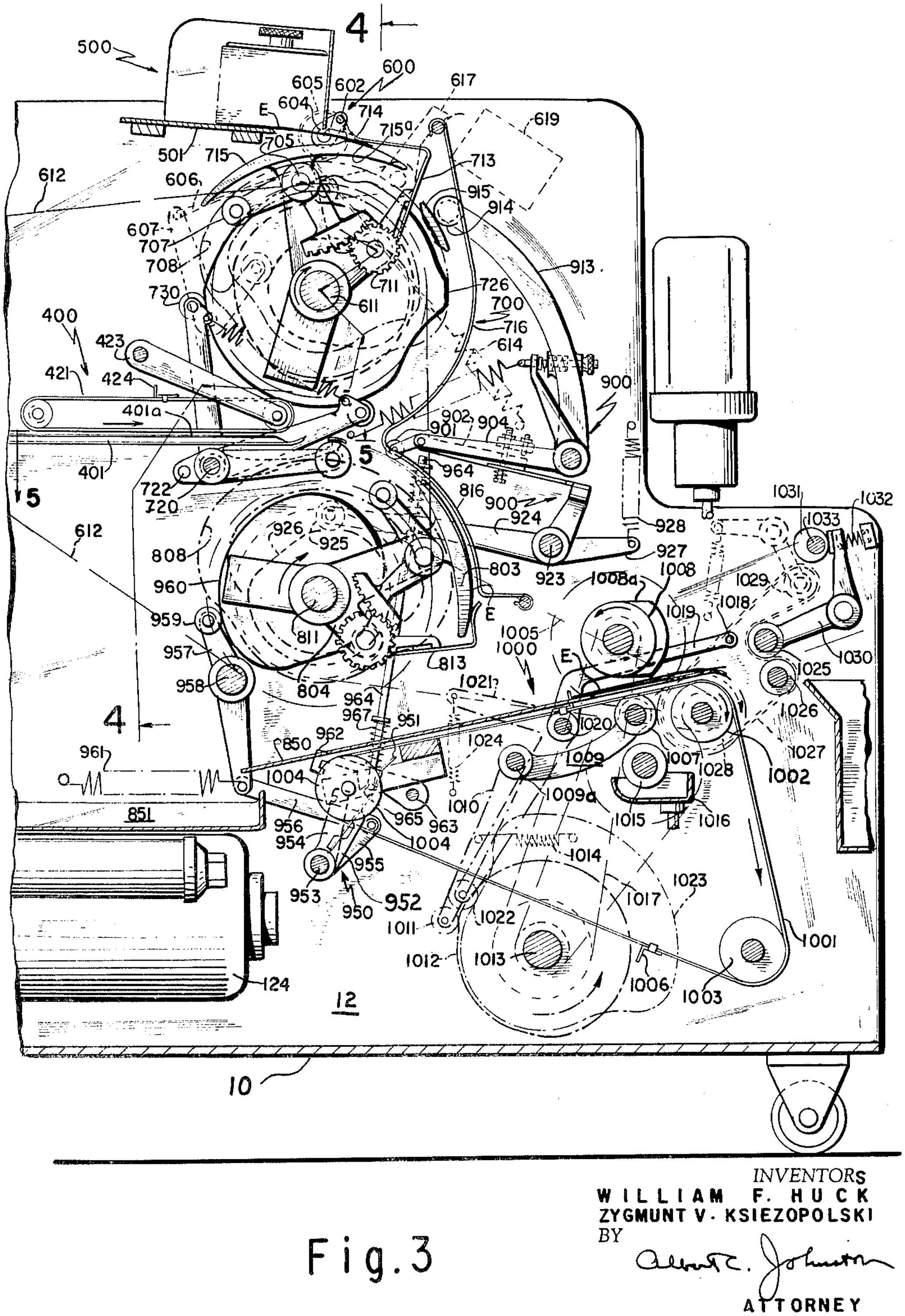
FIG. 3 is a side elevational view, partly in section, showing details of the envelope gripping, transfer, filling, detecting and sealing mechanisms of the filling apparatus of FIG. 1.
Figure 3A:
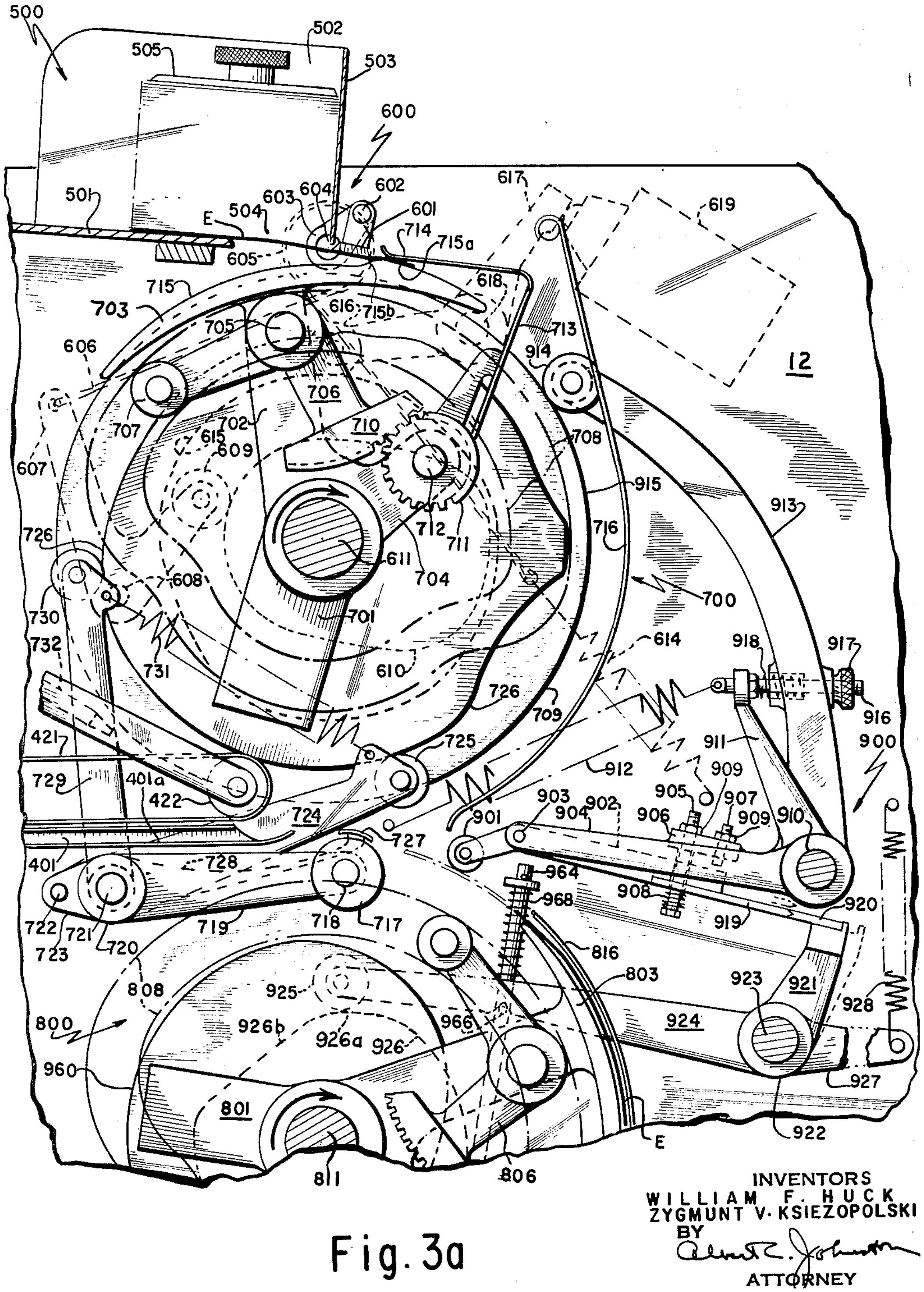
FIG. 3A is an enlarged view of the envelope gripping, transfer, filling and detecting mechanisms shown in FIG. 3.
Figure 4:
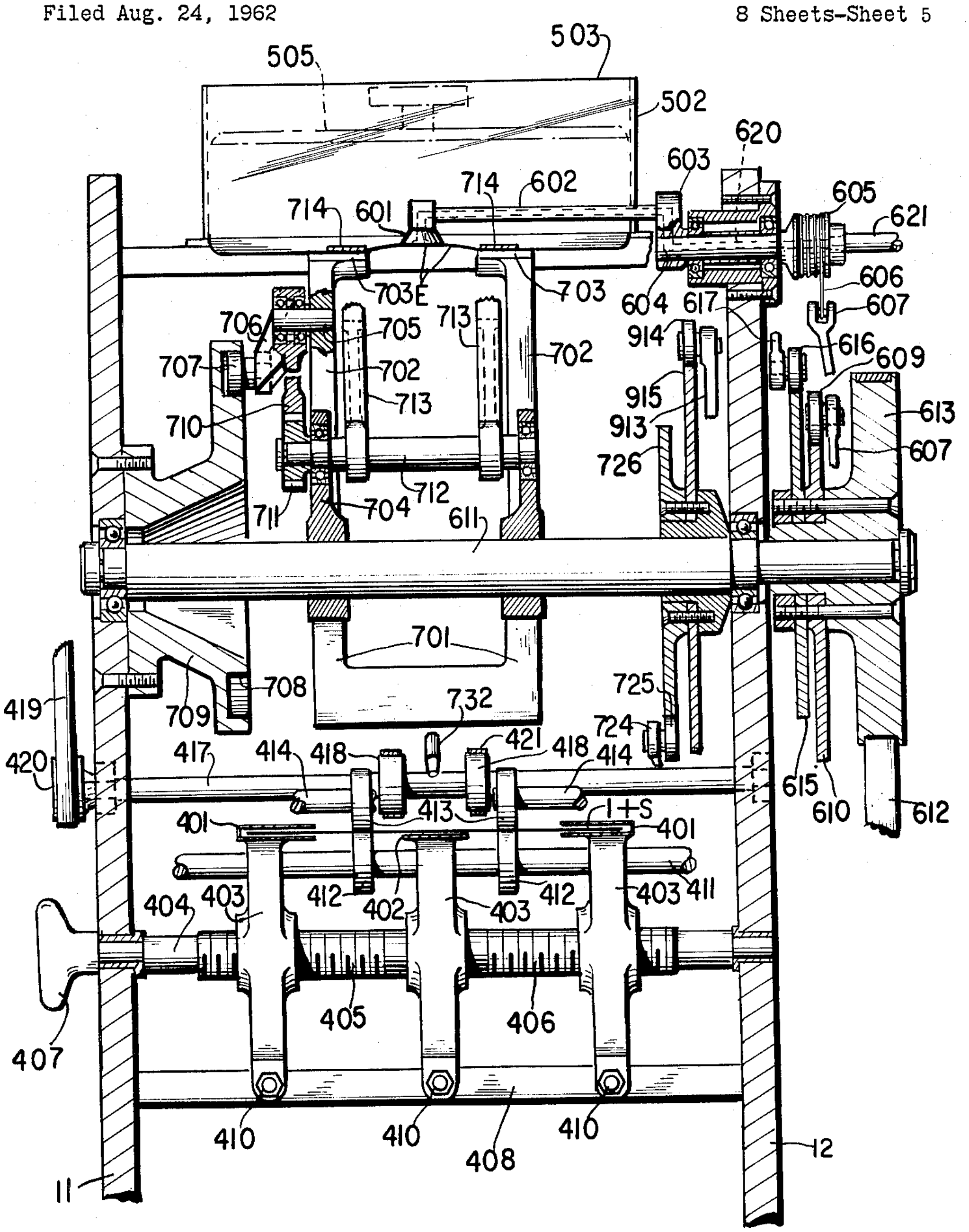
FIG. 4 is a sectional view taken on line 4—4 of FIG. 3.

The aforesaid mechanisms and assemblies, as shown most fully in FIGS. 2 and 3, are all supported by a frame structure comprising a base plate 10 and side frame members 11 and 12 and are all driven by an electric motor 13. The motor 13 drives a variable diameter pulley 14 around which is trained a belt 15 driving a pulley 16 carried on an idler shaft 17 supported between the frame members 11 and 12. The motor is carried on the lower end of an arm 18 pivotally mounted on a shaft 19. The upper end of arm 18 carries a nut 20 which is threadably engaged with screw 21 rotated by hand wheel 22. Rotation of hand wheel 22 pivots arm 18 about shaft 19 and varies the distance between the motor shaft and shaft 17 so that the radial location of the belt 15 on the variable diameter pulley 16 and thus the speed of belt 15 and shaft 17 are varied. A pulley 23 carried on the shaft 17 drives a belt 24 which in turn drives a pulley 25. The pulley 25 drives a gear 26 which drives a gear 27 driving a pulley 28 secured to a shaft 29. The pulley 28 drives a belt 30 which in turn drives a pulley 31 carried on a shaft 32.

Two insert feeder mechanisms, each indicated generally by reference numeral 100, are shown in FIG. 2, the left hand mechanism being viewed from the outside of the frame member 11 and the right hand mechanism being shown as a sectional view taken between the frame members 11 and 12. Each mechanism 100 includes a magazine 101 comprising a forwardly inclined plate 102 against which the forward edges of the stacked insert pieces I rest. The bottom of the insert stack is supported at its rear on an inclined support plate 103 and at its front on a ledge 104 fastened to the lower edge of the plate 102. The plates 102 and 103 and the ledge 104 are supported between the frame members 11 and 12 by fixed rectangular bars 105 and 106. A cover plate 107 is provided to rest on top of the insert stack to maintain downward pressure thereon.

Each mechanism 100 further includes one or more suction heads 108 each secured by a hollow arm 109 to a hollow shaft 110 which is supported between two crank arms 111 secured to the inner ends of stub shafts 112 carried by and passing through the frame members 11 and 12, respectively. A bellcrank 113 is secured to the outer end of the stub shaft 112 carried by the frame member 11. One end of the bellcrank 113 carries a follower roller 114 which engages a sucker cam 115 secured to journal extension 116 of a cylinder 117 rotatably mounted between the frame members. The outer end of the bellcrank 113 carries a post which is connected to the frame member 11 by a spring 118 which maintains follower roller 114 in continuous contact with cam 115 so that the sucker heads 108 oscillate between a position immediately underlying the bottom insert in the insert stack and a position adjacent the upper portion of the orbit of the cylinder 117 as the cylinder 117 rotates.

A second cam 119 secured to the journal 116 engages a follower roller 120 carried on one end of a bellcrank 121 pivoted on a stub shaft 122. The other end of bellcrank 121 engages the valve spool of an air valve 123 which includes an internal spring (not shown) continuously urging the follower roller 120 into contact with cam 119. The air valve 123 is connected by suitable conduits (not shown) to a vacuum pump 124 supported on the base plate 10 and to the hollow shaft 110 so that a vacuum is intermittently applied to the sucker heads 108 as the cylinder 117 rotates. The configuration of the cams 115 and 119 are so related that, as the sucker heads move into their position underlying the bottom insert in the insert stack, suction is applied at the sucker heads so that they grip the bottom insert and pull it downwardly from the stack through the opening between the plate 103 and ledge 104 and deposit its forward edge on the surface of the rotating cylinder 117, whereupon a nipping roller 125 is moved into contact with the forward edge of the insert so that the insert is thereafter fed between roller 125 and cylinder 117 and onto an inclined plate 126.

The nipping roller 125 is pivotally supported between the ends of arms 127 which are pin connected to arms 128. Arms 128 are clamped to a cross shaft 129 which is pivotally mounted between frame members 11 and 12. A pair of springs 130 acting between adjacent ends of each set of arms 127 and 128 continuously urge the roller into contact with the surface of cylinder 117. A journal extension of shaft 129 carries a bellcrank 131, one end of which rotatably supports a follower roller 132 engaging a cam 133 carried on the journal extension 116 and the other end of which is connected to frame member 11 by a spring 134 so that the follower roller 132 is continuously urged into contact with the cam 133. The nipping roller 125 is thus intermittently moved counter clockwise along the surface of the cylinder 117 to engage the forward edge of each insert deposited on the cylinder by the sucker heads and thereafter, in cooperation with the cylinder, feed the insert onto the inclined plate 126.

The plate 126 is provided with openings 135 which accommodate flanges 136 carried on a driven shaft 137. The flanges 136 extend through the opening 135 to frictionally engage and drive overlying propeller rollers 138. The flanges 136 and rollers 138 coact to positively feed each insert downwardly along the plate 136 to a belt conveyor 139. The propeller rollers 138 are rotatably mounted on arms 140 secured to pivot shaft 141 extending between the frames 11 and 12. Torsion springs (not shown) continuously urge rollers 138 into frictional contact with the flanges 136. The shaft 137, and thus the propeller rollers 138, are driven from the cylinder 117 by a belt 142.

The belt conveyor 139 onto which the inserts I leaving the inclined plate 126 are deposited comprises a plurality of horizontally moving belts 143 each of which carries a plurality of L-shaped pusher fingers 144 which engage the trailing edge of the inserts and propel them toward the right as viewed in FIG. 1. The belts 143 are driven by a pulley 145 secured to a shaft 146 and pass around an idler pulley 147 secured to a shaft 148. The pulley 145 is driven by a pulley 149 secured to a journal extension of shaft 146. A belt 150 driven by a pulley secured to a journal extension of shaft 32 drives the pulley 149. A pulley 151 secured to a journal extension of shaft 148 drives a timing belt 152 which in turn drives the cylinders 117 and thereby the aforesaid sucker heads, nipping rollers, and propelling rollers. The inserts are moved to the right on belts 143 until they are picked off of belts 143 by a plurality of flat belts 153 which are driven by a pulley 154 secured to shaft 32 and pass around an idler roller 155 and a second idler roller 156 carried on the shaft 146. Another set of flat belts 157 is arranged to run above the belts 153 and cooperate with the belts 153 to move the inserts further to the right.

The sheet feeding mechanism, indicated generally by the reference numeral 200, is substantially identical in arrangement and construction to the above described insert feeding mechanism. Thus, the sucker heads 208, the cylinder 217, the nipping roller 225 and the propelling rollers 238 cooperate in the manner previously described with reference to the insert feeders to remove the bottom most sheet S from a stack of sheets supported in the magazine 201 and move it positively between the cylinder and nipping roller and downwardly along the inclined plate 226. The shaft 216 and cylinder 217 are driven by a timing belt 248 secured to a journal extension of the shaft 32.

The sheets S upon leaving the inclined plate 226 pass between feed rollers 301 and 302 of the folding mechanism indicated generally by the reference numeral 300. The roller 301 is driven by the pulley 25 and the roller 302 is driven by suitable gearing from the roller 301. The leading portion of each sheet after leaving the rollers 301 and 302 is directed into an upwardly and forwardly inclined buckle chute 303 which contains a stop member 304 against which the leading edge of the sheet subsequently abuts. The leading edge of the sheet is thereby prevented from advancing further while the trailing portion of the sheet continues to be advanced by rollers 301 and 302 until it is caused to bulge downwardly into the area between roller 302 and a roller 305 driven by suitable gearing from roller 302. The sheet is subsequently gripped between the rollers 302 and 305 at a location approximately one third of its length from its trailing edge at which location the sheet is folded and drawn downwardly as thus folded between the rollers. The leading folded edge of the sheet is then fed into a rearwardly and downwardly inclined buckle chute 306 which contains a stop member 307 against which the leading folded edge abuts. The folded edge of the sheet is thereby prevented from advancing further, while the now trailing portion of the sheet continues to be advanced by rollers 302 and 305 until it is caused to bulge forwardly into the area between the rollers 305 and a roller 308 driven by suitable gearing from roller 305.

The sheet is subsequently gripped between the rollers 305 and 308 at a location approximately one third of its original length from its original leading edge, at which location the sheet is again folded and drawn as thus twice folded between the rollers 305 and 308.

The insert and sheet feeding mechanism 100 and the folding mechanism 300 are so timed relative to each other that an insert or inserts I are discharged from the belts 153 and 157 and fed between the rollers 305 and 308 at the same instant that the second fold is being initiated in a sheet S as it reclines in buckle chute 306. The sheet and insert or inserts thus pass between the rollers 305 and 308 as a package with the inserts disposed between the first and second layers of the folded sheet.

Upon leaving the rollers 305 and 308 the sheet and insert package, i.e., the set of insert material for enclosure in each envelope, enters the chute assembly or horn 400. The assembly 400, as shown in FIGS. 2–5, includes two horizontally disposed channel members 401 opening toward each other and adapted to engage and guide opposite end portions of each set of the insert materials, and a flat plate 402 disposed between the members 401 so as to slidably support the central portion of the insert material. The channel members lead the successive sets of insert material into forward end portions of these members, seen at 401*a* and 401*b* in FIG. 5, which constitute a stationary filling member or horn to receive the insert materials, one set thereof after another, so that they may be enclosed within envelopes which are fed continuously, one after another, to and then over the filling member or horn and then away from it with enclosed insert material as hereinafter described. The members 401 and 402 are each supported by Y shaped bracket 403 and the brackets 403 are in turn supported on a screw shaft 404 supported between the frame members 11 and 12. The shaft 404 has oppositely threaded portions 405 and 406 which respectively engage threaded bores in the brackets 403 supporting the members 401 so that the channel members may be moved apart or together to accommodate varying sheet and/or insert widths by selective rotation of a hand wheel 407 secured to one end of the shaft 404.

The lower end of each bracket 403 is slotted to receive a fixed square bar 408 supported between the frame members and each lower end carries a compression spring 409 and a set screw 410 engaging opposite sides of the bar 408 so that by rotation of the screws 410 the tilt of the members 401 and 402 may be adjusted. A shaft 411 supported between the frame members passes through the space between the branches of the Y shaped brackets and carries rollers 412 which cooperate with rollers 413 carried on shaft 414 supported between the outer ends of crank arms 415 to engage the sheet and insert package as it leaves the folding rollers 305 and 308 and advance it along the guideway defined by members 401 and 402. Shaft 411 is driven through an idler gear from folding roller 308 and torsion springs (not shown) continuously urge crank arms 415 counter clockwise about the axis of shaft 416 so that the rollers 413 are maintained in pressurized contact with rollers 412. A shaft 417 supported between the frame members carries rollers 418. The shaft 417 and rollers 418 are driven by a belt 419 engaging a pulley 420 secured to a journal extension of the shaft 417. The rollers 418 in turn drive belts 421 which also pass around idler rollers 422 carried on the lower ends of pivotable arms 423. Each belt 421 carries a single pusher 424 which engages the trailing edge of the sheet and insert package after it has left the rollers 412 and 413 and pushes the package further along the guideway defined by the members 401 and 402 and subsequently feeds it into an envelope which has previously been removed from the envelope feeder magazine 500 and fed onto and over the forward pointed ends of the horn portions 401*a* and 401*b* of the channel members 401 by the upper transfer cylinder assembly 700.

The envelope feeder magazine 500, as shown most fully in FIGS. 3 and 4A, comprises an inclined bottom plate 501, side plates 502 which are slidable along the plate 501 to accommodate varying envelope widths, and a front plate 503. The envelopes E are stacked in the magazine with their flap ends abutting the front plate 503 and with their flaps folded beneath and against the bodies of the envelopes so that the flap on the bottom most envelope in the stack overlies the space 504 between the forward edge of the bottom plate 501 and the lower edge of the front plate 503. Downward pressure on the stack is maintained by a cover plate 505.

The envelopes are opened by the flap opening assembly 600 which includes a sucker head 601 secured to a horizontally extending tube 602 secured to one end of a crank arm 603 mounted on a shaft 604 pivotably mounted in the frame member 12. A pulley 605 is secured to the shaft 604 outside the frame member 12 and a cable 606 is wrapped several times around the pulley 605. One end of the cable 606 is secured to one end of a bellcrank 607 pivotably mounted on a shaft 608 extending from frame member 12. The other end of the bellcrank carries a cam follower 609 which engages a cam 610 secured to a journal extension of a shaft 611 supported between the frame members. The shaft 611 and thereby the cam 610 are continuously rotated by a belt 612 which is driven from the shaft 29 and passes around a pulley 613 secured to the journal extension of shaft 611. The other end of the cable 606 is secured to aspring 614 secured to the frame member 12. The spring 614 acts to continuously urge the cam follower 609 into contact with cam 610 so that as the shaft 611 rotates the sucker head 601 oscillates between a first position immediately underlying the space 504 and a second position removed approximately 180° from its first position. The sucker head is shown in every instance in its second position.

A cam 615 secured to the journal extension of the shaft 611 inboard of the cam 610 is engaged by a follower roller 616 carried on one end of a bellcrank 617 pivoted on a stub shaft 618. The other end of the bellcrank 617 engages the valve spool of an air valve 619 which includes an internal spring (not shown) continuously urging the follower 616 into contact with cam 615. The air valve is connected to a passage 620 formed in the shaft 604, and thus to the sucker head 601, by a conduit 621, and to the vacuum pump 124 by suitable conduit means (not shown) so that a vacuum is intermittently applied to the sucker head 601 as the shaft 611 rotates. The configurations of the cams 610 and 615 are so related that, as the sucker head 601 moves into its position underlying the opening 504, suction is applied at the sucker head so that it grips the flap of the bottom most envelope in the stack and thereafter pivots it counter clockwise about the fold line preformed in the envelope to a position leading the body of the envelope as the sucker head moves to its second position. The axis of the shaft 604 is preferably substantially aligned with the fold line of the bottom most envelope in the magazine so that the arcuate path traced by the sucker head is substantially concentric with this fold line. The flap, while disposed in its position leading the body of the envelope, is thereafter gripped by the upper transfer cylinder assembly 700 and the envelope removed from the stack.

The upper transfer cylinder assembly 700 includes two generally Y shaped rotor members 701 secured to the shaft 611 at spaced locations thereon. Each rotor member includes an arm 702, an arcuate flange 703 on the radially outer end of the arm 702, and a stub arm 704. A stub 705 projects from the arm 702 of one of the members and a bellcrank 706 is pivotally mounted on the stud. One end of the bellcrank 706 carries a follower roller 707 which continually engages a cam groove 708 provided in a cam member 709 fastened to the inside of the frame member 11. The other end of bellcrank 706 carries a gear sector 710 concentric with the axis of the stud 705. The gear sector 710 engages a pinion 711 secured to one end of a shaft 712 rotatably mounted in and between the stub arms 704. Secured to the shaft 712 are two L-shaped spring steel grippers 713 having trailing gripping ends 714 adapted to intermittently coact with the flanges 703 to grip an envelope therebetween. The profile of the cam groove 708 is such that as the arcuate flanges 703 and grippers 713 approach the area underlying the magazine 500, the gripper ends 714 are disposed in an angular position substantially clockwise of a line passing through the axes of the shafts 611 and 712 so that the gripper ends are considerably ahead of the leading edge of the flanges 703, and are tucked radially inwardly with respect of the shaft 611 so as to pass freely beneath the lower edge of the plate 503 of the magazine 500.

Figures 6, 9:
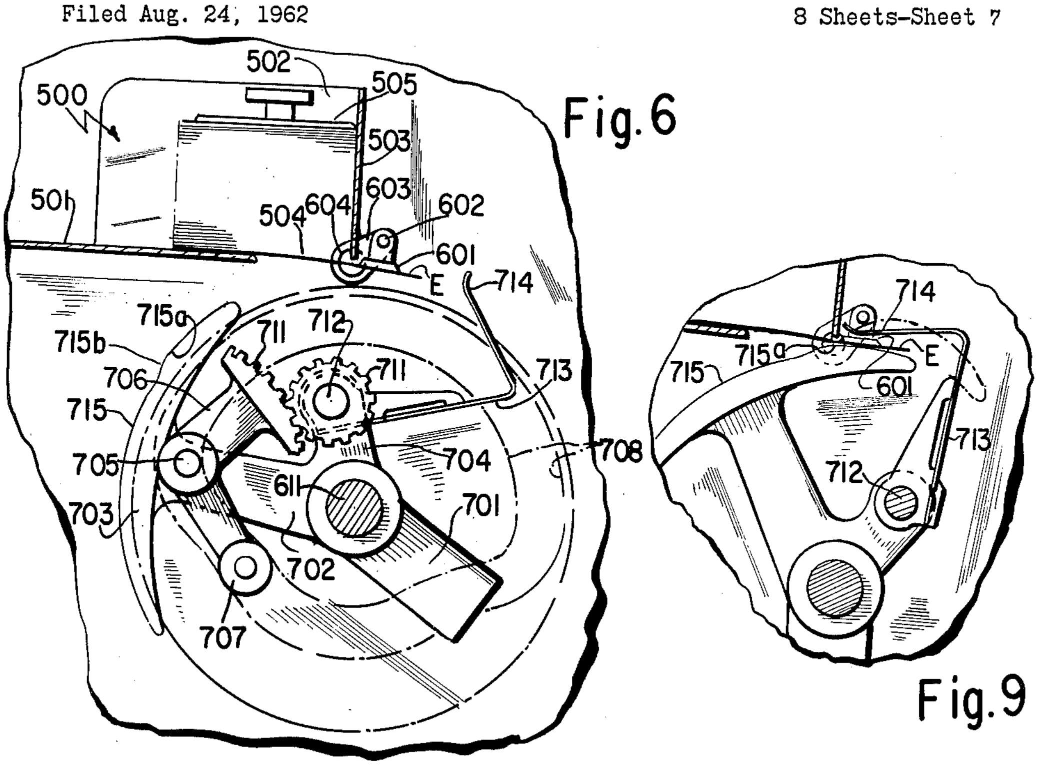
Figure 7:
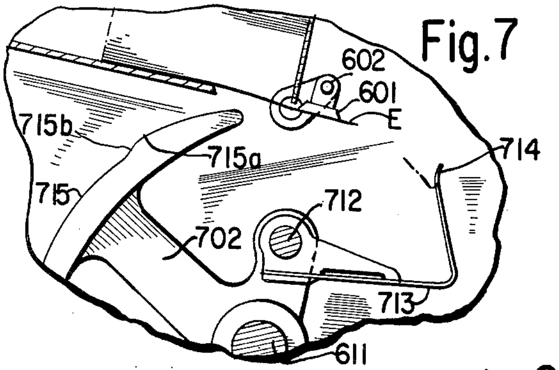
Figure 10:
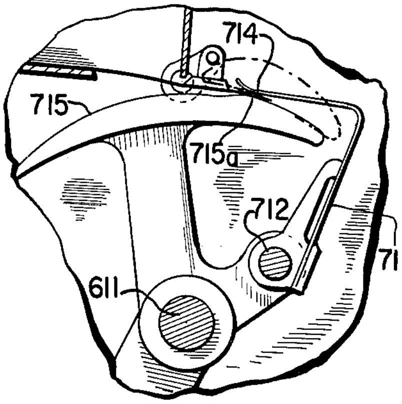
Figure 8:
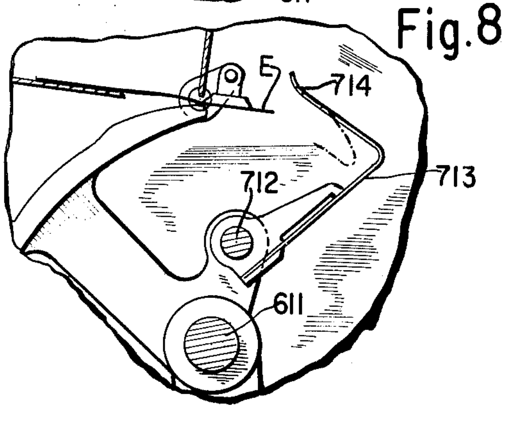

After passing beneath the magazine, and as seen in FIGS. 6–8, the grippers are moved counterclockwise about the axis of the shaft 712 and are thereby moved radially outwardly and rearwardly with respect to the flanges 703. As the counter clockwise movement of the grippers continues it carries their gripping ends past the line passing through the axes of the shafts 611 and 712 whereupon continued counterclockwise movement moves them radially inward and further rearwardly with respect to the flanges until they reach a position as seen in FIG. 9 directly overlying the flap of an envelope E, which flap has been moved to its opened position by the oscillating movement of the flap opening assembly 600 during the time elapsing between the last passage of the flanges 703 and the present passage of the grippers 713. At this time, the flanges have reached a position, as seen in FIG. 9, in which their leading portions directly underly the opened flap which continues to be held by the sucker head 601. Further rotative movement of the rotor moves the grippers rearwardly and radially inwardly relative to the flanges, while they are moving forwardly and radially inwardly relative to the flap, until the grippers occupy the position seen in FIG. 10 where they grip the leading edge portion of the enevelope flap between themselves and high dwell portions 715*a* formed on the outer peripheral surfaces 715 of the flanges. At this time, the suction to the sucker head 601 is terminated, thereby releasing the flap, and the angular movement of the grippers about the axis of the shaft 712 is terminated by movement of the follower roller 707 onto a dwell portion of the cam groove 708 so that as the rotor continues to rotate the enevelope is pulled from the bottom of the magazine and transported edgewise and flap first in a circular path toward the bottom of the orbit of the rotors. The path followed by the gripping ends 714 relative to the article supporting surface 715 of the flange members 703 during the course of the above described gripping operation is shown by the chain time-motion line progressively developed in FIGS. 6–10.

It will be seen that the leading surface portions at 715*a* of the flange or article supporting members 703 pass along the under side of the protruding flap of the lowermost envelope E in the magazine 500 and that they are so located and sufficiently elongated that they will limit the position of the entire width of the flap relative to the axis of the rotor, irrespective of the variations of flap width occurring with the differently sized envelopes for which the machine is designed. It will also be evident that the whole peripheral surface 715 of the flange members 703 is sufficiently long in the direction of the rotor movement that it will suppot and limit the radial position of the entire width of any of said envelopes when the flap is unfolded.

The trailing edge of the gripped envelope is maintained in close proximity to the flanges during its circular movement with the flanges by a stationary curved guide 716. As the flanges approach the bottom of their orbit, the grippers are pivoted by the interaction of the cam follower 707 and cam 708 in a clockwise direction about the axis of the shaft 712, thereby moving the gripper ends 714 radially outwardly and away from the flanges and releasing the envelope flap so that it may be passed tangentially from the rotor orbit under the pointed ends of the previously described filling member or horn formed by end portions 401*a* and 401*b* of the channel members 401.

In order to insure that the envelope will be guided smoothly and positively over the filling member or horn, means are provided to buckle the body of the envelope so as to separate the body-forming layers or walls thereof as the envelope is being moved onto the filling member, so that the envelope will present an open cavity to pass about such member and enclose insert material entering the filling member in the opposite direction.

When the gripper ends 714 release their hold on the envelope flap, the envelope is engaged and pressed against the supporting surfaces 715, thus being continued in movement with the rotor 700, by a pair of rollers 717 bearing against those surfaces at a relatively fixed location in their orbit. See FIGS. 11 and 12. The rollers 717 are rotatably mounted on pins 718 carried on the ends of arms 719. The other ends of the arms 719 are integral with a hub 720 rotatably mounted on a shaft 721 rotatably supported by and between the frame members at a location underlying and spaced rearwardly from the pointed ends of the horn portions 401*a* and 401*b* of the channel members 401. A rod 722 is joined at its one end to a radial extension 723 on the hub 720 and at its other end to one end of an arm 724 pivotably mounted between its ends on the shaft 721. The other end of the arm 724 carries a follower roller 725 which engages with a cam 726 secured to the shaft 611 at a location thereon inboard of the frame member 12.

Figure 5:
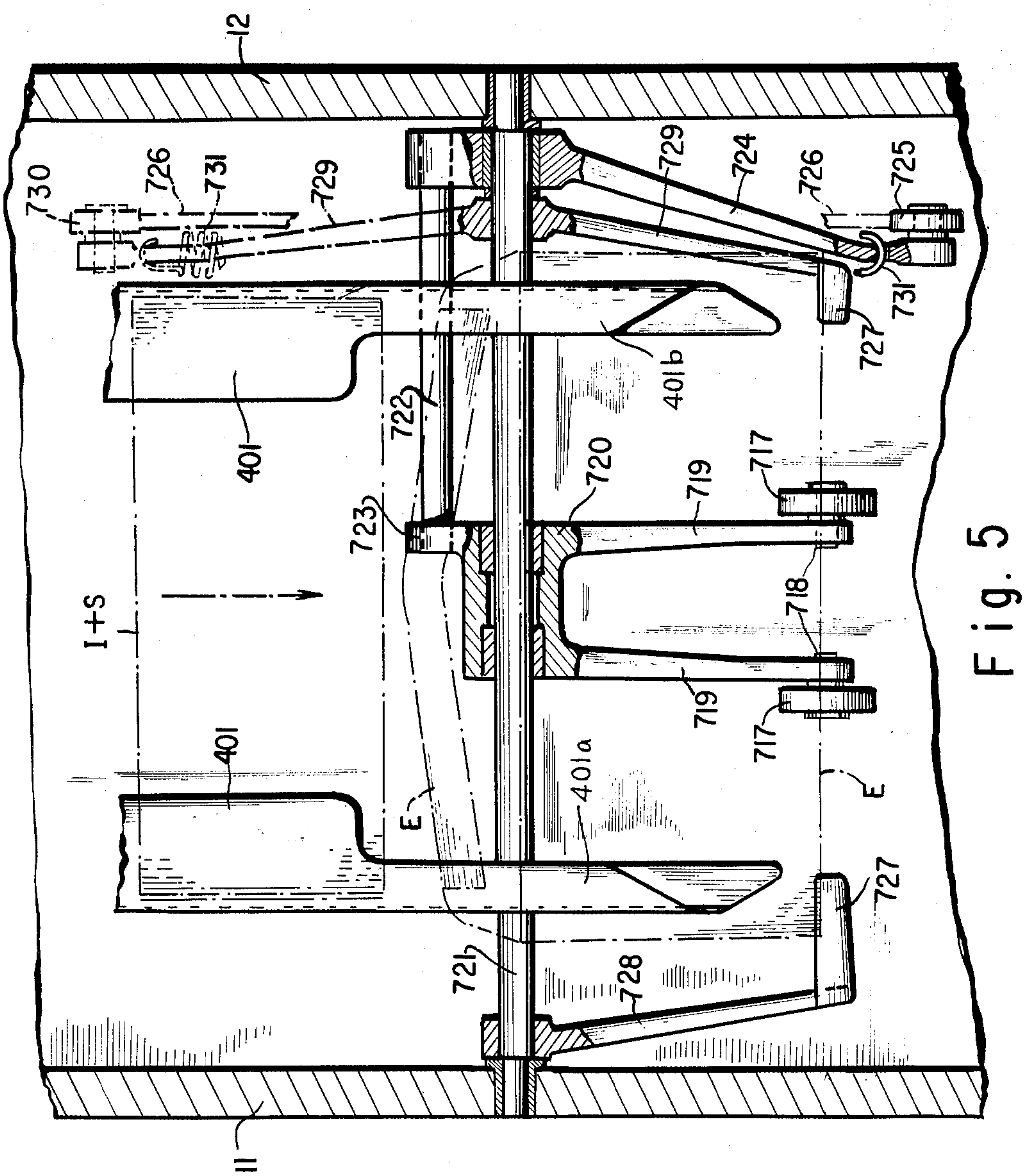
FIG. 5 is a sectional view taken on line 5—5 of FIG. 3.

As may be seen in FIG. 5, the rollers 717 engage portions of the envelope near its center at a location just ahead of the pointed ends of the horn portions 401*a* and 401*b* which constitute the filling member. At a like orbital location the opposite end portions of the envelope, which protrude laterally from the envelope supporting surfaces 715 of the rotor, are engaged and lifted toward the axis of the rotor by a pair of lift fingers 727 which have sliding engagement with the end portions of the moving envelope. See FIG. 5 and FIGS. 11–16.

One of the lift fingers is carried on the outer end of an arm 728 the inner end of which is secured to the shaft 721 adjacent the frame member 11. The other lift finger is carried on one end of a bellcrank 729 secured to the shaft 721 adjacent the frame member 12. The other end of the bellcrank carries a follower roller 730 which also engages the cam 726. Follower rollers 725 and 730 are maintained in continuous contact with the cam 726 by a spring 731 interconnecting the follower ends of the bellcrank 729 and the arm 724.

Figures 11, 12, 13, 14, 15, 16:
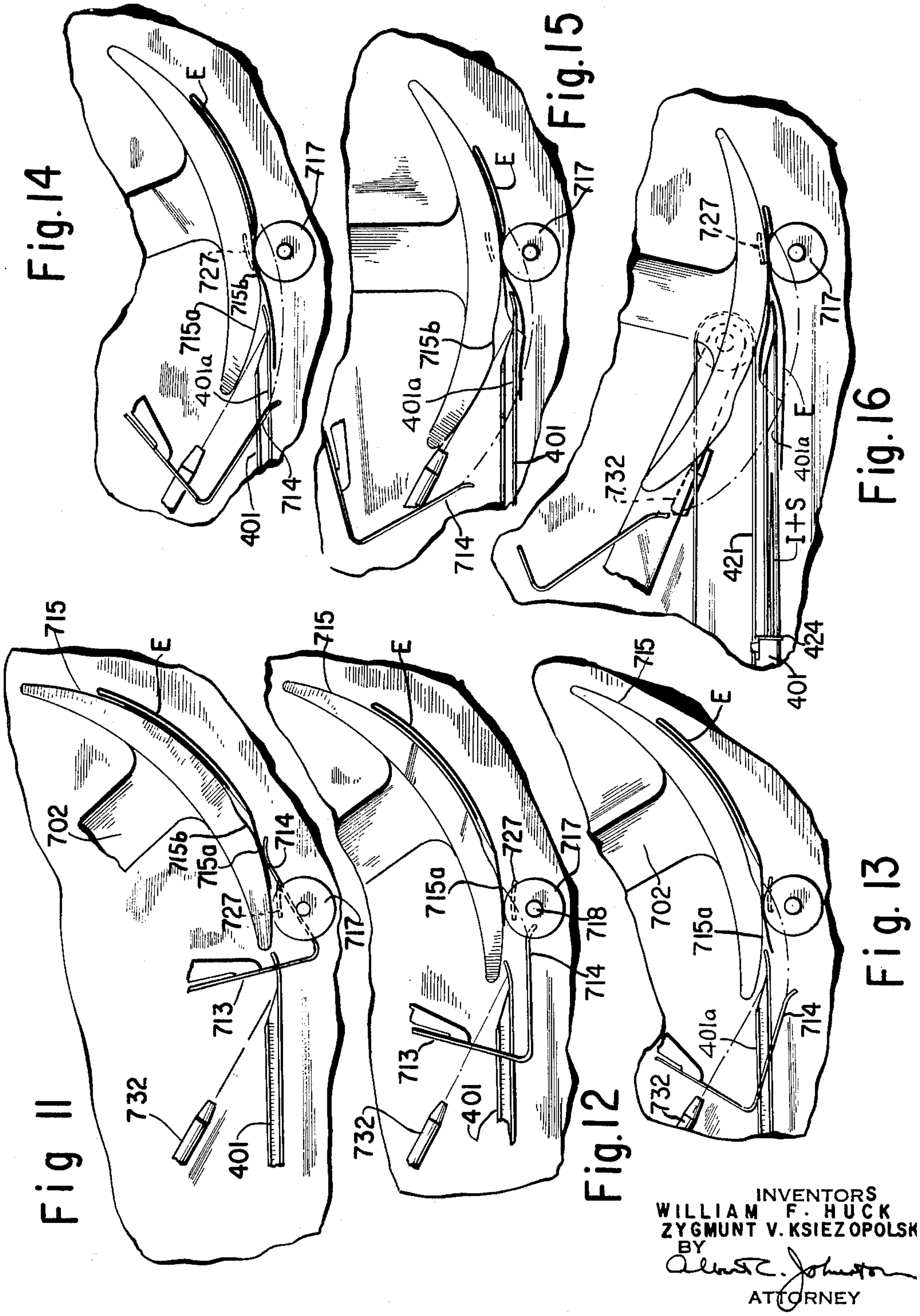

The profile of the cam 726 is such that as the flanges approach the bottom of their orbit, as seen in FIG. 11, the rollers 717 are moved upwardly into rolling contact with the peripheral surface 715 of the flanges. As the flanges continue their rotative movement, and as seen in FIG. 12, the rollers 717 roll along the surface 715 and onto and over the leading edge of the flap of the envelope and the grippers 713 are then moved away from the surface 715 so that the flap is now gripped and advanced between the rollers 717 and the surface 715. Further rotation of the rotor brings the rollers 717 to the fold line at the trailing edge of the flap, causing the flap to assume a position substantially tangential to the arcuate surface 715 with the leading adge of the flap spaced from that surface, as seen in FIG. 13, so as to pass freely beneath the pointed ends of the channel members 401. As the rollers 717 roll beyond the high dwell portion 715*a* they are moved further upwardly by the interaction of follower roller 725 and cam 726 so that, as seen in FIG. 14, they follow radially falling portion 715*b* of the surface 715. Simultaneously with the movement of the rollers 717 along the falling portion 715*b*, the lift fingers 727 are moved upwardly into contact with the opposite end portions of the envelope.

The combined action of the rollers 717 and the left finger 727 causes a localized buckling or bowing and opening of the body of the envelope just ahead of the pointed ends of the horn portions 401*a* and 401*b*, resulting in a progressive separation between the upper and lower layers of the envelope near the center thereof. The size and extent of this separation may be increased by means of a nozzle 732 which directs a pressurized air blast downwardly into the separation. Air under pressure is supplied to the nozzle through flexible conduit (not shown) extending between the nozzle and the exhaust duct of the vacuum pump 124. The envelope with its upper and lower layers thus separated passes freely over the horn portions 401*a* and 401*b* of the channel members 401, as indicated in respect to portion 401*a* in FIGS. 15 and 16, and into a position for receiving the insert material $I+S$ being fed into the horn portions through the guideway formed by the channel members. When the envelope has been fed entirely onto the filling member or horn, it has passed out of engagement with the rollers 717 and lift fingers 727 and thus will come to rest, whereupon those elements are moved downwardly to await the arrival of the next envelope.

The operation of the insert feeders, sheet feeder, folding mechanism and pusher conveyor 421 is so timed relative to the operation of the transfer cylinder assembly or rotor 700 that as each envelope comes to rest in its position over the filling member, an insert and sheet package $I+S$ will have been propelled by the pusher 424 along the guideway and into the open envelope. The filled envelope is thereafter removed from its position over the filling member by the lower transfer cylinder assembly or rotor 800 which transfers it downwardly in a semi circular path leading away from the orbit of rotor 700 to the envelope delivery and sealing mechanism 1000.

The lower transfer cylinder assembly 800 is substantially identical in construction and operation to the upper transfer cylinder assembly previously described. Thus, the lower transfer cylinder assembly includes Y-shaped rotor members 801 which are secured to a shaft 811 driven by the belt 612 and these rotor members carry grippers 813 pivotably mounted on the stub arms 804 and moved by the interaction of a cam groove 808 and a bellcrank 806 into a position overlying the arcuate flanges 803 as the flanges move into a position under the filled envelope, whereupon the body of the envelope is gripped between the grippers and the flanges and the envelope thereafter transported bottom first along the orbit of the rotors, with the trailing edge guided by the curved guides 816, to a location adjacent the bottom of that orbit where the grippers are moved away from the flanges to release the envelope. The envelope, upon being released, is deposited onto inclined guides 850 whereafter the envelope is moved up the guides to the sealing mechanism 1000, if the envelope and its contents are of the proper thickness, or is allowed to slide by gravity down the guides and into a reject bin 851, if the thickness is not proper.

The means which determines whether the envelope will be moved up the guides and sealed, or allowed to slide down the guides and be rejected, includes an envelope detector mechanism, indicated generally by the reference numeral 900, which automatically gauges the total thickness of the envelope with its contents, and an envelope rejector mechanism, indicated generally by the reference numeral 950, which is controlled by the detector mechanism and operates to reject any envelopes whose thickness is found by the detector mechanism not to be according to specifications.

The envelope detector mechanism 900 includes a sensing roller 901 mounted on one end of an arm 902 mounted between its ends on a shaft 903 pivotably mounted between the outer forked ends of an arm 904. A bolt 905 is threadably received at its upper end in a bridge member 906 spanning the forked ends of arm 904 and passes at its lower end through a vertical bore in the arm 902. A set screw 907 is threadably received in the bridge member 906 and engages at its lower end with the upper surface of arm 902. A compression spring 908 disposed between the head of the bolt 905 and the under surface of the arm 902 urges the arm 902 into contact with the lower end of screw 907. Nuts 909 are provided on the upper ends of the bolt 905 and screw 907 to lock them in any position of adjustment.

The inner end of arm 904 is secured to a shaft 910 pivotably mounted between the side frame members 11 and 12. Also secured to the shaft 910 is an arm 911 whose outer end is engaged by a tension spring 912. Pivotably mounted on shaft 910 is an arm 913 which carries at its outer end a follower roller 914 engaging a cam 915 secured to shaft 611 at a location therein immediately inboard of the frame member 12. Arms 911 and 913 are interconnected by a spring loaded screw arrangement comprising a screw 916, adjusting nut 917 and compression spring 918. This spring loaded screw arrangement cooperates with the tension spring 912 to continuously urge the follower roller 914 into contact with cam 915. The outer end of the arm 902 carries a blade 919, the tip of which is adapted to engage with a complementally grooved block 920 carried on the upper end of an arm 921 integral at its lower end with a hub 922 mounted on a shaft 923. Also integral with hub 922 is an arm 924, which carries at its outer end a follower roller 925 contacting a cam 926 secured to shaft 811 and an arm 927, which is engaged at its outer end by a tension spring 928.

The envelope rejector mechanism 950 includes envelope delivery blades 951 carried on arms 952 secured to a shaft 953 pivotably mounted between the frame members 11 and 12. Also secured to shaft 953 are a lock arm 954 having a hook-shaped outer end and a follower arm 955. The follower arm 955 is pin connected to a link 956 which, in turn, is pin connected to the lower end of a bellcrank 957 pivotably mounted on a stub shaft 958 projecting inwardly from frame member 12. The upper end of bellcrank 957 carries a follower roller 959 which engages a cam 960 secured to the shaft 811. A spring 961 engages the lower end of bell crank 957 to continuously urge follower roller 959 into contact with cam 960 so that as the cam 960 rotates with the shaft 811 the delivery blades 951 and lock arm 954 continuously oscillate about the axis of the shaft 953. The envelope reject mechanism further includes a latch arm 962 pivotably mounted on a stub shaft 963 projecting inwardly from the frame member 12. The outer end of a latch arm 962 is hook-shaped and is adapted to engage with the hook-shaped outer end of the lock arm 954. The latch arm 962 is provided near its center with a vertical bore which receives the lower end of a vertically extending rod 964.

The upper end of rod 964 passes through a vertical bore in the arm 924 of the envelope detecting mechanism. Pins 965 and 966 carried on the lower and upper ends respectively of the rod 964 engage notches formed on the lower sides of the arms 962 and 924, respectively.

The sensing roller 901 is oscillated by the interaction of the follower roller 914 and cam 915 between an inactive position remote from the orbit of the flanges 803 and an active or sensing position in which it is spaced from the orbit of the flanges 803 by a distance just less than the thickness of the filled envelopes. The angular position of the high and low portions of the cam 915 relative to that of the flanges 803 is such that the sensing roller begins its movement towards its sensing position immediately after the leading edge of a filled envelope gripped between the flanges 803 and the grippers 813 has been moved past the location of the sensing roller. The roller thus initially contacts a point on the filled envelope spaced from the bottom or leading edge of the envelope so as not to interfere with the forward movement of the envelope. Since the sensing position of the roller 901 is at a distance from the orbit of the flanges 803 less than the thickness of a filled envelope the arms 904 and 913 continue to move counter clockwise about the axis of shaft 910 after contact of the sensing roller with the envelope. Since the sensing roller is prevented from further counter clockwise movement by the filled envelope, this continued counter clockwise movement of the arms 904 and 913 results in a clockwise movement of the arm 902 and sensing roller 901 about the axis of the shaft 903 against the resistance of the compression spring 908. The amount of counter clockwise movement of the arm 902 is thus determined by the thickness of the filled envelope so that the position assumed by the tip of the blade 919 is a measure of the envelope thickness.

The cam 926 includes a gently falling profile portion 926*a* and a steeply falling profile portion 926*b*. The angular position of the cam 926 relative to that of the other previously described positioning elements is such that the follower roller 925 enters upon the gently falling profile portion 926*a* of the cam 926 as the tip of the blade 919 is positioned by contact of the roller 901 with the filled envelope. The grooved block 920 is thus moved counter clockwise about the axis of the shaft 923 and toward the tip of the blade 919. If the filled envelope is of the desired thickness, the block will engage the tip of the blade with the result that the follower roller will be prevented from entering upon and following the steeply falling profile portion 926*b* of cam 926. The filled envelope of desired thickness is thereafter released by the grippers 813 and deposited bottom edge first onto the inclined guides 850. As the envelope is deposited onto the guides 850, its bottom edge engages delivery blades 951, which at this time are moving in a counter clockwise direction about the shaft 953. The delivery blades thereafter terminate their counter clockwise movement and begin to move clockwise, thereby pushing the envelope, with its flap leading and facing downwardly, up the guides 850 toward the delivery and sealing mechanism 1000.

If the filled envelope detected by the sensing roller 901 has a thickness greater or lesser than desired, the counter clockwise movement of the grooved block about the axis of the shaft 923 in response to movement of the follower roller onto the gently falling profile portion 926*a* of the cam 926 will carry it either above or below the tip of the blade 919 with the result that the follower roller will enter upon and follow the steeply falling profile portion 926*b*. Movement of the follower roller along the portion 926*b* moves the arm 924 counter clockwise about the axis of the shaft 923, thereby moving the rod 964 downwardly and pivoting the latch arm counter clockwise about the axis of the shaft 963 to a position in the path of the continuously oscillating lock arm 954. The latch arm and lock arm will thereafter interlock and prevent further counter clockwise movement of the pusher blades with the result that the filled envelope upon being deposited upon the guides 850 is allowed to slide by gravity down the guides and into the reject bin 851.

The envelope detector and reject mechanisms may be adjusted to accommodate various desired envelope thicknesses by successive adjustments of the screws 917 and 907. Rotation of the screw 917 pivots arms 904 and 911 in unison about the center of the shaft 910 to adjust the spacing of the sensing position of the roller 901 from the orbit of the flanges 803. The screw 907 is then rotated to rotate the arm 902 relative to the arm 904 to a position where the tip of the blade 919 will engage with the grooved block 920 at the desired thickness of the filled envelopes. Since adjustment of screw 907 will change by a slight amount the position of the roller 901, it may be necessary to again adjust the screw 917. Only a few successive adjustments of the screw 917 and 907 will normally be necessary to achieve an accurate adjustment.

The delivery and sealing mechanism 1000, to which the filled envelopes of desired thickness are delivered by the pusher blades 951, includes a pair of continuously moving endless delivery belts 1001 trained around driven pulleys 1002 and idler pulley 1003 and 1004. Pulleys 1002 are driven from the lower transfer cylinder assembly by a belt 1005. Each belt 1001 carries two L shaped pushers 1006 which engage the rear edge of an envelope which has been moved up the guides 850 by the blades 951 and push the envelope further upward along the guides and between a ductor roller 1007 and a pressure roller 1008.

Ductor roller 1007 is rotatably supported between the one ends or arms 1009*a* which are secured at their other ends to a shaft 1009 pivotably mounted in the frame members 11 and 12. Also secured to shaft 1009*a* is an arm 1010 which carries at its outer end a follower roller 1011 engaging a moistening cam 1012 secured to a continuously rotating shaft 1013. A spring 1014 continuously urges the follower roller 1011 into contact with the cam 1012 so that as the shaft 1013 rotates ductor roller 1007 oscillates between a raised position immediately underlying the guides 850 and a lowered position in which it contacts and accumulates moisture from a continuously rotating moistening roller 1015 contacting at its lower periphery water or appropriate adhesive solvent held in a trough 1016. Pressure roller 1008 is driven from shaft 1013 by a belt 1017 and includes a flange portion 1008*a* which cooperates with the ductor roller when the latter is in its raised position to moisten the glue area on the downwardly facing flap of the envelope passed therebetween. After cooperating to moisten the glue area on the flap, the flange portion 1008*a* is moved upwardly and away from the guides 850 by continued rotation of roller 1008 to provide a clearance between the flange portion and the guides for the free passage of the filled body of the envelope, and the ductor roller 1007 is moved downwardly to its lowered position where it accumulates moisture preparatory to again being raised to cooperate with the flange portion 1008*a* during the next passage of the latter to moisten the glue area on the next envelope.

The moistened envelope leaving the rollers 1007 and 1008 is moved by the pushers 1006 to a position where the flap of the envelope overlies the forward end of the guides 850, at which position the flap is contacted and folded downward about the fold line preformed in the envelope by a downwardly moving rod 1018. The rod 1018 is secured at its ends to the radially outer ends of two arms 1019 secured at their inner ends to a shaft 1020 pivotally mounted in frame members 11 and 12. A bellcrank 1021 is secured to a journal formed as an extension of shaft 1020. One end of the bellcrank 1021 carries a follower roller 1022 engaging a flap folding cam 1023 secured to shaft 1013 and the other end of a bellcrank 1021 is secured to a spring 1024 which maintains roller 1022 in continuous contact with cam 1023 so that as shaft 1013 rotates rod 1018 oscillates in a generally vertical arcuate path to perform the previously described flap folding operation.

The envelope, with its flap positioned at approximately 90° to the direction of the envelope travel by the rod 1018, thereafter passes between coacting sealing rollers 1025 and 1026 which act to firmly press the moistened flap to the envelope body and thereafter discharge the sealed envelope from the machine. The rollers 1025 and 1026 are driven by a belt 1027 trained around a driven pulley 1028 and a tensioning pulley 1029. The sealing roller 1025 is carried between the lower ends of a pair of bellcranks 1030 the upper ends of which are maintained in continuous contact with rollers 1031 by a compression spring 1032 so that, by rotation of a hand wheel (not shown) secured to the extended journal of the rod 1033 eccentrically carrying the rollers 1031, the spacing between the sealing rollers 1025 and 1026 may be varied to accommodate filled envelopes of varying thickness.

The sealed and discharged envelope, upon leaving the sealing rollers, may enter an appropriate delivery device such, e.g., as a belt conveyor or a collecting tray.

From the foregoing it will be seen that the present invention provides an envelope filling apparatus which, by reason of the novel operational and constructional features disclosed herein, is capable of operating at a higher speed and with a greater reliability than known apparatus of this type.

Although a preferred embodiment of an envelope filling apparatus according to the invention has been shown and described it is to be understood that the new features of the invention may be utilized in other ways and are not restricted to the preferred embodiment except as required by a fair construction of the appended claims.

We claim:

1. An apparatus for filling envelopes comprising
a sheet magazine adapted to hold a stack of sheets,
sheet feeder means operative to grip the bottom most sheet in said stack and move it positively to a folding station of the apparatus,
a folding mechanism at said folding station operative to receive said sheet from said sheet feeder means and fold it to envelope size,
a stationary filling member,
means operative to move said folded sheet from said folding mechanism into said filling member,
an envelope magazine adapted to hold a stack of envelopes with the flaps of the envelopes folded against the envelope bodies,
flap opening means operative to grip the flap of the bottom most envelope in said stack and move it about the flap fold line preformed in the envelope to a position leading the body of the envelope,
first transfer means operative to grip said flap in its said leading position and move said envelope flap first through a path aligned with its own plane to a position at said filling member where it receives said folded sheet from said filling member,
second transfer means operative to grip said envelope and sheet therein at said position and move the same positively away from said position to a delivery station of the apparatus through another path aligned with the plane of the envelope,
a delivery mechanism at said delivery station operative to move said envelope with said sheet therein to a sealing station of the apparatus,
and means detecting the thickness of said envelope with said sheet therein as the same is moved along said other path and operative upon the detection of a thickness thereof varying from a desired thickness to render said delivery mechanism inoperative so that only filled envelopes having said desired thickness are delivered to said sealing station.

2. In an apparatus comprising feeding rollers operative to feed a sheet of material into a buckle chute extending at an angle to the feeding direction of said feeding rollers so that the sheet will bulge outwardly upon continued feeding movement thereof after the leading edge thereof has abutted the end of said chute and coacting folding rollers between which the bulging portion of said sheet is gripped to fold the sheet at said portion and thereafter advance it between the folding rollers, means for feeding an insert into the space behind said bulging portion as the latter is forming so that said insert is thereafter advanced between said folding rollers between the folds of said sheet, said insert feeding means comprising
a first belt having a flight extending along a line substantially tangent to the bite of and substantially normal to the rotational axis of said folding rollers, said flight terminating at a location immediately behind said folding rollers,
a second belt having a flight adjacent and parallel to and coextensive with that of said first belt,
means driving said belts at the same speed and in directions such that both of said flights move toward said folding rollers,
and means operative to feed an insert between said flights in timed relation to the feeding movement of said sheet so that the insert is thereafter gripped between and moved positively along said flights and into the space behind the bulging portion of said sheet as the latter is being folded as aforesaid.

3. An envelope filling apparatus comprising a rotor forming an envelope support at its periphery, means for continuously rotating said rotor, a filling member adjacent the orbit of said rotor and adapted to receive insert material for enclosure in an envelope, an envelope supply station adjacent said orbit at a location away from said filling member, and means coacting with said support upon rotation of said rotor to grip thereto an envelope at said supply station and move the envelope edgewise along said orbit to and then tangentially from said orbit onto said filling member to a position thereabout where the envelope incloses insert material received in said filling member.

4. An apparatus according to claim 3, said means coacting with said support including gripper means carried by said rotor for holding a leading edge portion of said envelope to said support during movement of the envelope from said supply station to a zone of said orbit just ahead of said filling member, said gripper means being released from the envelope in said zone, and roller means bearing against and rolling along said support as it is rotated through said zone to keep the envelope gripped to said support until the envelope has been moved onto said filling member.

5. An apparatus according to claim 3, said filling member comprising channel elements spaced apart to receive the insert material and having end portions tapered to pointed ends lying close to said orbit so that said ends will engage a leading edge portion of the envelope with said edge portion moving under said ends and guide said edge portion onto said channel elements.

6. An apparatus according to claim 5, and means acting on the body of said envelope in a zone of said orbit just ahead of said pointed ends to buckle said body and thereby separate the walls thereof as it advances onto said filling member so that it will pass freely over and inclose insert material within the filling member.

7. An apparatus according to claim 6, said means to buckle said body including fingers slidingly engaging opposite end portions of said body in said zone and operative therein to lift such opposite end portions in a direction toward the axis of said rotor as the wall of the envelope carrying said leading edge portion passes under said pointed ends.

8. An apparatus according to claim 3, further comprising at said supply station a magazine in which envelopes are stacked one above another with their flaps folded against the lower sides of their bodies, a sucker shaft pivotable about an axis substantially aligned with the flap fold line of the lowermost envelope in said magazine, a sucker head carried by said shaft to one side of said axis, means for applying suction through said head, and means for pivoting said shaft in one direction to swing said head into engagement with and grip the flap of said lowermost envelope and then pivoting said shaft in the opposite direction to return said head and unfold said flap to a position leading the body of the envelope.

9. An apparatus according to claim 8, further comprising a drive shaft, separate sucker and vacuum cams secured to and rotatable with said drive shaft, follower means engaging said sucker cam and operative upon rotation of said drive shaft to oscillate said sucker shaft, a source of vacuum, and follower means engaging said vacuum cam and operative upon rotation of said drive shaft to connect said sucker head to said source of vacuum during each oscillation of said head.

10. An apparatus according to claim 3, said filling member being at the end of a channel structure for leading insert material thereinto, said structure including two channel members opening toward each other and adapted to engage and guide opposite end portions of each set of the insert material, and means for adjusting the distance between said channel members to accommodate insert material of varied length, said adjusting means comprising first and second arms respectively carrying said channel members and a shaft having oppositely threaded portions respectively engaging threaded bores in said arms so that by selective rotation of said shaft the distance between said channel members may be selectively varied while keeping these members aligned with the path of the envelopes.

11. An apparatus according to claim 10, further including positioning means engaging each of said arms at a location spaced away from said channel members and said threaded bore, and adjustable to displace each said arm about the axis of said shaft whereby to adjust the slope of each channel member.

12. In an apparatus for filling envelopes, having envelope supply, filling and delivery stations at spaced locations, the combination of a stationary filling member at said filling station adapted to receive insert material for enclosure in an envelope, continuously operating means for feeding insert materials successively into said filling member, means including a continuously rotating transfer assembly for gripping an envelope at said supply station and carrying the envelope edgewise, top edge first, through an arcuate path to said filling member and then tangentially from said path over said filling member to a position thereabout where the envelope incloses insert material received within said filling member, and means for gripping said envelope with said insert material therein at said position and carrying the same edgewise, bottom edge first, off of said filling member and through another path to said delivery station.

13. An apparatus according to claim 12, further comprising delivery means normally acting upon each filled envelope reaching said delivery station to move the filled envelope forward in a further path, a sensing member contacting and positionable by each envelope moving to said delivery station through said other path, said member assuming a certain position upon contacting a filled envelope of a desired thickness, and means acting in response to the assumption by said sensing member of any but said certain position to interrupt the operation of said delivery means so that only filled envelopes having said desired thickness are moved in said further path.

14. An apparatus according to claim 13, comprising at said delivery station an inclined surface down which said envelopes will slide by gravity and onto which each envelope carried through said other path is deposited at a definite location, said delivery means including an arm member and means driven in synchronism with said envelope gripping and carrying means to move said arm member from an idle position beneath said surface to a position in which said member projects above said surface at a point downwardly from said location to prevent an envelope deposited on said surface from sliding theredown, and then to move said arm member with said envelope upwardly along said surface, said means to interrupt the operation of said delivery means including means to inactivate said driven means so that said arm member will remain in idle position and an envelope not having the desired thickness will slide by gravity down said surface and away from the path of envelopes having said desired thickness.

15. An apparatus according to claim 13, comprising an operating member moved from a first toward a second position in synchronism with the movement of each envelope through said other path and acting in said second position to interrupt the operation of said delivery means, said sensing member carrying a stop element which it positions in the path of said operating member upon contacting an envelope of desired thickness, whereby to prevent said operating member from reaching said second position and thus allow said delivery means to move said envelope through said further path, said sensing member positioning said stop member out of the path of said operating member upon failing to contact an envelope of said desired thickness, whereby said operating member will reach said second position and interrupt the operation of said delivery means.

16. An apparatus according to claim 13, comprising a drive shaft, first and second cams secured to said drive shaft, a first follower arm engaging said first cam and carrying a notched block movable by the interaction of said cam and said follower from a first toward a second position, said delivery means including a delivery arm having idle and active positions, means including a second follower arm engaging said second cam and operable by rotation of said drive shaft to move said delivery arm to its active position, means responsive to the arrival of said block at said second position to hold said delivery arm in its idle position, and said sensing member carrying a blade element having a pointed end which it positions in the path of movement of said notched block upon contacting a filled envelope of desired thickness, whereby to prevent said block from reaching its said second position and allow said second arm to move said arm to its active position, said pointed end being positioned out of the path of said notched block upon failure of said sensing member to contact a filled envelope of said desired thickness, whereby said notched block will reach its said second position to inactivate said delivery arm.

17. An apparatus according to claim 12, further comprising means to feed filled envelopes successively from said delivery station through a further path with the flap of each envelope extended from its body, a ductor roller to apply liquid to one side of the flap of each envelope advancing in said further path, a pressure roller at the other side thereof and presenting an acurate sector to press said flap against said ductor roller, said pressure roller being circumferentially recessed away from said sector to move clear of the body of such envelope, said ductor roller being mounted for displacement to and from a source of liquid disposed away from said further path, and means for rotating said pressure roller and displacing said ductor roller in synchronism with the operation of said feeding means so that said rollers will coact to moisten the flap yet provide clear passageway for the body of each said envelope.

18. An apparatus according to claim 12, further comprising means to feed filled envelopes successively from said delivery station through a further path with the flap of each envelope extended ahead of its body and the inner side of the flap facing downward, a supporting surface upon and along which said envelope is slid by said feeding means, said surface terminating at an edge lying transverse to the direction of movement of the envelope, a bar reciprocable across said further path in parallel and closely spaced relation to said edge, means for reciprocating said bar in synchronism with the operation of said feeding means so that as the flap of each filled envelope protrudes beyond said edge said bar is moved downwardly across said flap to pivot the flap about its fold line to a position at an angle to the body of the envelope, and roller means just beyond the path of said bar for gripping the envelope and pressing the angled flap to closed position against said body while advancing the envelope away from said bar.

19. An apparatus according to claim 18, said roller means comprising two coacting rollers between which said envelope is passed and means for adjusting the space between said rollers to accommodate envelopes of varied thickness, said adjusting means comprising a pivotally mounted lever having an arm carrying one of said rollers, spring means constantly urging said lever in the direction to close said space, and an adjustably positioned member engaging said lever to limit, and movable to adjust, the position taken by said one roller under the force of said spring means.

20. An envelope filling apparatus comprising a rotor forming an envelope support at its periphery, means for continuously rotating said rotor, a filling member adjacent the orbit of said rotor and adapted to receive insert material for enclosure in an envelope, an envelope supply station adjacent said orbit at a location away from said filling member, continuously operating means for feeding insert materials successively into said filling member in synchronism with the rotations of said rotor, means coacting with said support upon rotation of said rotor to grip thereto an envelope at said supply station and move the envelope edgewise along said orbit to said filling member and then tangentially from said orbit onto said filling member to a position thereabout where the envelope incloses insert material received in said filling member, and means operated in synchronism with the rotation of said rotor to grip said envelope with insert material therein at said position and carry the same edgewise, bottom edge first, off of said filling member and through a path away from said orbit to a delivery station.

21. An apparatus for filling envelopes comprising a first rotor, a second rotor having an orbit contiguous to that of said first rotor, an envelope filling member adjacent the orbits of both rotors and adapted to receive insert material for enclosure in an envelope, an envelope supply station adjacent the orbit of said first rotor at a location away from said filling member, a delivery station adjacent the orbit of said second rotor at a location away from said filling member, means for synchronously rotating said rotors, means carried at the periphery of and operated with rotation of said first rotor to grip an envelope at said supply station and move it from said supply station along the orbit of said first rotor to a position at said filling member where it receives insert material from said filling member, and means carried at the periphery of and operated with rotation of said second rotor to grip said envelope with said insert material therein at said filling member and move the same from said filling member along the orbit of said second rotor to said delivery station.

22. An apparatus for filling envelopes each having an open top and a closed bottom, comprising a first rotor forming an envelope support at its periphery, a second rotor having an orbit contiguous to that of said first rotor, an envelope filling member adjacent the orbits of both rotors and adapted to receive insert material for enclosure in an envelope, an envelope supply station adjacent the orbit of said first rotor at a location away from said filling member, a delivery station adjacent the orbit of said second rotor at a location away from said filling member, means for rotating said rotors in synchronism and in the same angular direction, means coacting with said support upon rotation of said first rotor to grip thereto an envelope at said supply station, move the envelope top first from said supply station along the orbit of said first rotor to said filling member, and feed it top first over said filling member to a position thereabout where the envelope incloses insert material received within said filling member, and means carried at the periphery of and operated with rotation of said second rotor to grip said envelope with said insert material therein at said position and move the same bottom first off of said filling member and along the orbit of said second rotor to said delivery station.

23. An apparatus for filling envelopes each having a flap at the top thereof and a closed bottom, comprising a first rotor rotatable about a horizontal axis and forming an envelope support at its periphery, an envelope magazine adjacent an upper portion of the orbit of said first rotor and adapted to hold a plurality of said envelopes stacked one above another with their flaps folded against the lower sides of their bodies, a second rotor having a horizontal axis of rotation and describing an orbit contiguous to that of said first rotor, an envelope filling member adjacent the orbits of both rotors and adapted to receive insert material for enclosure in an envelope, a delivery station adjacent the orbit of said second rotor at a location away from said filling member, a flap gripping device swingable about a horizontal axis adjacent to said magazine, means for swinging said device in one direction about its axis to a position to grip the flap of the lowermost envelope held in said magazine and then swinging said device in the opposite direction to unfold said flap to a position leading the body of the envelope, means for rotating said rotors in synchronism with each other and with the movement of said flap gripping device, means coacting with said support upon rotation of said first rotor to grip thereto the opened flap of the lowermost envelope in said stack, move said envelope flap first from said magazine along the orbit of said first rotor to said filling member, and feed said envelope flap first over said filling member so that it incloses insert material received within said filling member, and means carried at the periphery of and operated with rotation of said second rotor to grip said envelope with said insert material therein at said filling member and move the same, bottom edge first, off of said filling member and along the orbit of said second rotor to said delivery station.

24. An apparatus for filling envelopes each having an open top and a closed bottom, comprising a first rotor forming an envelope support at its periphery, a second rotor having an axis of rotation spaced from and parallel to the axis of said first rotor and describing an orbit contiguous to that of said first rotor, an envelope filling member adjacent the orbits of both rotors and adapted to receive insert material for enclosure in an envelope, an envelope supply station adjacent the orbit of said first rotor at a location away from said filling member, a delivery station adjacent the orbit of said second rotor at a location away from said filling member, means for rotating said rotors in synchronism and in the same angular direction, means coacting with said support upon rotation of said first rotor to grip thereto an envelope at said supply station and move the envelope, top edge first, from said supply station along the orbit of said first rotor to said filling member and then tangentially onto the same, means acting on the body of said envelope as it approaches said filling member to buckle said body and thereby separate the walls thereof so that the envelope will pass freely over and inclose insert material within the filling member, and means carried at the periphery of and operated with rotation of said second rotor to grip said envelope with said insert material therein at said fillling member and move the same, bottom edge first, off of said filling member and along the orbit of said second rotor to said delivery station.

25. An apparatus for filling envelopes having a flap at the top and a closed bottom comprising a first rotor rotatable about a horizontal axis, an envelope magazine adjacent an upper portion of the orbit of said first rotor and adapted to hold a plurality of said envelopes stacked one above the other with their flaps folded against the lower sides of their bodies, a second rotor having a horizontal axis of rotation and describing an orbit contiguous to that of said first rotor at a zone between said axes, an envelope filling member adjacent said zone and adapted to receive insert material for enclosure in an envelope, a delivery station adjacent the orbit of said second rotor at a location away from said zone, a flap gripping device swingable about a horizontal axis substantially aligned with the flap fold line of the lowermost envelope in said magazine, means for swinging said device in one direction about its axis to a position to grip the flap on said lowermost envelope and then swinging said device in the opposite direction to unfold said flap about its fold line to a position leading the body of the envelope, means for rotating said rotors in synchronism with each other and with the movement of said flap gripping device, means carried at the periphery of and operated with rotation of said first rotor to grip the opened flap of said lowermost envelope and move said envelope flap first from said magazine along the orbit of said first rotor to said filling member, means engaging said envelope as it approaches said filling member to buckle said envelope so as to produce a separation at the top thereof between the walls forming its body and allow it to be fed flap first over said filling member to inclose insert material received within said filling member, means carried at the periphery of and operated with rotation of said second rotor to grip said envelope with said insert material therein at said filling member and move the same bottom first off of said filling member and along the orbit of said second rotor to said delivery station, delivery means operative when each filled envelope reaches said delivery station to move said envelope away to a sealing station of the apparatus, and means detecting the thickness of each envelope moving along the orbit of said second rotor and operative upon the detection of any thickness thereof varying from a desired thickness to interrupt the operation of said delivery means so that only filled envelopes having said desired thickness will be delivered to said sealing station.

26. In an apparatus for filling envelopes having a rotor, an envelope supply station disposed adjacent a first portion of the orbit of said rotor, and an envelope filling member disposed adjacent a portion of said orbit spaced from said first portion and to and over which the envelops are fed top first from said supply station to receive insert material delivered to said filling member, means for separating the upper and lower layers of each envelope prior to its being fed over said filling member, said separating means comprising a support surface at the periphery of said rotor, said surface including a leading portion concentric with the axis of said rotor and against which the flap of an envelope is gripped to carry the envelope along said orbit from said supply station to said filling member and a trailing portion of progressively decreasing radius adjoining said leading portion, bearer means traversed by said surface and for pressing said envelope against it as said surface is moved through a portion of said orbit approaching said filling member, said bearer means being biased to follow the contour of said surface, and buckling members engaging opposite end portions of each envelope as it is moved with said surface through said approaching orbit portion to lift said end portions toward said axis and produce in cooperation with said bearer means as the latter press the envelope against said trailing surface portion a separation between said layers at the top thereof whereby the envelope will pass readily onto said filling member.

References Cited by the Examiner

UNITED STATES PATENTS

| | | | |
|---|---|---|---|
| 1,050,476 | 1/1913 | Liljeros | 53—266 X |
| 1,421,835 | 7/1922 | Russ | 53—266 |
| 2,225,005 | 12/1940 | Gudger | 209—88 |
| 2,337,064 | 12/1943 | Peters | 209—88 |
| 2,628,465 | 2/1953 | Penley | 53—385 X |
| 2,728,178 | 12/1955 | Kern | 53—266 |

TRAVIS S. McGEHEE, *Primary Examiner.*

ROBERT A. LIEGHEY, FRANK E. BAILEY, *Examiners.*

A. E. FOURNIER, *Assistant Examiner.*